United States Patent [19]

Takahashi et al.

[11] Patent Number: 5,369,148
[45] Date of Patent: Nov. 29, 1994

[54] METHOD FOR CONTINUOUS AGGLOMERATION OF AN ABSORBENT RESIN POWDER AND APPARATUS THEREFOR

[75] Inventors: Hitoshi Takahashi; Hiroyuki Kakita; Yoshio Irie, all of Himeji; Teruaki Fujiwara, Nagaokakyo; Kazumi Akihisa, Himeji, all of Japan

[73] Assignee: Nippon Shokubai Co., Ltd., Osaka, Japan

[21] Appl. No.: 781,140
[22] PCT Filed: Apr. 27, 1990
[86] PCT No.: PCT/JP90/00560
§ 371 Date: Dec. 26, 1991
§ 102(e) Date: Dec. 26, 1991
[87] PCT Pub. No.: WO91/17200
PCT Pub. Date: Nov. 14, 1991

[51] Int. Cl.⁵ .............................. C08F 6/00; B01J 2/16
[52] U.S. Cl. ......................... 523/315; 523/344; 528/481; 528/483; 425/222; 525/54.26; 525/54.24
[58] Field of Search ............... 523/315, 344; 528/481, 528/483; 525/54.26; 425/222

[56] References Cited

U.S. PATENT DOCUMENTS

| | | | |
|---|---|---|---|
| 3,632,257 | 1/1972 | Ashizawa | 425/222 |
| 4,259,053 | 3/1981 | Wahli | 425/222 |
| 4,539,936 | 9/1985 | Yasui et al. | 528/481 |
| 4,640,839 | 2/1987 | Hsu | 425/222 |
| 4,734,478 | 3/1988 | Tsubakimoto et al. | 527/300 |
| 5,002,986 | 3/1991 | Fujiura et al. | 524/54.26 |

FOREIGN PATENT DOCUMENTS

| | | |
|---|---|---|
| 53-37105 | 10/1978 | Japan. |
| 1-178524 | 7/1989 | Japan. |
| 1-236932 | 9/1989 | Japan. |

*Primary Examiner*—Paul R. Michl
*Assistant Examiner*—Andrew E. C. Merriam
*Attorney, Agent, or Firm*—Burns, Doane, Swecker & Mathis

[57] ABSTRACT

Continuous agglomeration of an absorbent resin powder is accomplished by a method which comprises introducing the absorbent resin powder into a cylindrical member having an open lower end by means of a current of air through a dispersing member disposed in the upper part of the cylindrical member and, at the same time, spraying minute droplets of an aqueous liquid downwardly through a nozzle disposed inside the dispersing member thereby establishing mutual parallel flow contact between the absorbent resin powder descending toward the lower part of the cylindrical member as dispersed with the current of air and the liquid droplets descending toward the lower part of the cylindrical member as diffused in the radial direction, and removing the produced agglomerate having a plurality of particles of the absorbent resin powder cohesively united through the medium of the liquid droplets via the lower part of the cylindrical member. An apparatus for working the method is also disclosed.

18 Claims, 2 Drawing Sheets

METHOD FOR CONTINUOUS AGGLOMERATION OF AN ABSORBENT RESIN POWDER AND APPARATUS THEREFOR

TECHNICAL FIELD

This invention relates to a method for the continuous agglomeration of an absorbent resin powder by agglomerating minute particles contained in the absorbent resin powder thereby adjusting particle sizes of the resin powder within a fixed range and to an apparatus for the execution of this method.

BACKGROUND ART

In recent years, the absorbent resin powder has come to find utility in various fields specializing in such hygienic articles as sanitary napkins and disposable diapers and water-retaining agents. The absorbent resin of this quality has been generally produced by polymerizing a resinous raw material, drying the resultant polymer, and pulverizing the dry polymer with a pulverizer. The absorbent resin powder resulting from the pulverization, therefore, contains minute particles short of desired particle sizes. When the absorbent resin powder containing the minute particles is put to use, it has the disadvantage that the minute particles are drifted.

Thus, the practice of incorporating a drift-preventing agent in the resin powder for the purpose of improving the dry flowing property of the resin powder as disclosed in the specification of JP-A-52-121,658 and the practice of incorporating a dust-proofing agent in the resin powder for the purpose of curbing the drifting of minute particles contained in the resin powder as taught in the specification of JP-A-63-39,934 have been heretofore followed.

Further, the method for effecting removal of the minute particles from the resin powder by the use of a sieve and the method for enlarging only the minute particles in the resin powder by the use of a binder have been conceived. The former method, however, is undesirable on account of poor economy. The latter method generally requires use of an organic solvent type binder and, therefore, not only entails the danger of ignition during the step of drying subsequent to the size enlargement but also jeopardizes the biological safety owing to the residue of the organic solvent. The latter method is liberated from this problem when the binder to be used therein is in the form of an aqueous solution. Since the absorbent resin powder produced by pulverization with a binder has the nature of quickly absorbing the aqueous solution, however, the aqueous solution encounters difficulty in allowing uniform dispersion and mixture of the minute particles therein and the agglomeration tends to form large lumps of high density. When the large lumps are to be pulverized, this pulverization entails occurrence of minute particles and produces uniformly aggregated particles only with difficulty.

For the solution of this problem, the method which as taught in JP-A-61-97,333 and JP-A-61-101,536 comprises uniformly mixing the absorbent resin powder and an aqueous liquid and agglomerating the resultant mixture by the use of a specific mixing device such as, for example, a high-speed rotary paddle type mixer or an air current type mixer and then crushing the produced agglomerate has been heretofore tried.

It has been found, however, that the method which effects the mixture of the absorbent resin powder with the aqueous liquid by virtue of the shearing force of the high-speed rotary type mixer as described above produces a powder of an unduly small basic particle diameter. This adverse phenomenon may be logically explained by a supposition that when the resin powder is mixed by stirring in the mixer, the component particles of this powder undergo repetitious mutual collision and, at the same time, yield to fracture due to mechanical shear. When the particles of the resin powder having the particle surface thereof specially treated in advance for the purpose of qualitative improvement are fractured as described above, the fractured particle surface poses a problem of qualitative degradation.

When the air current type mixer mentioned above is to be adopted, it has a problem of unfitness for commercial production of an absorbent resin powder because it is incapable of continuous stirring. Moreover, the mixer has another problem of practically uneasy maintenance because the otherwise inevitable adhesion of particles of the powder to the mixer must be prevented by keeping the resin powder heated and meantime adding thereto the aqueous liquid piecemeal for a long time.

JP-A-1-236,932 proposes a spray agglomerating apparatus for effecting continuous agglomerating of a powder. This spray agglomeration apparatus comprises a drying chamber, a powder supply device provided with a powder discharge outlet disposed above the drying chamber, and spray nozzles disposed one each on the opposite sides of the powder discharge outlet and adapted to spout mutually intersecting currents of liquid droplets.

This apparatus is effective for the purpose of effecting continuous agglomeration of the powder of dextrin or melamine resin, for example. When this apparatus is adopted for the agglomeration of an absorbent resin powder with an aqueous liquid, however, it fails to accomplish the primary object of continuous size enlargement because viscous agglomerate of the absorbent resin which have acquired increased viscousness due to absorption of water adhering to the wall of the apparatus and the deposit of viscous agglomerate thus formed gains in volume with the elapse of time. Further, when the absorbent resin powder and the aqueous liquid contact each other at the position of mutual intersection of the projected threads of the aqueous liquid, the dispersion of the mixture caused by the force of collision due to the discharge of liquid droplets is insufficient and the state of contact is ununiform. The enlarged particles consequently obtained, therefore contain minute particles which have escaped the size enlargement and suffer occurrence of wet clusters which have absorbed water in a large amount.

In view of the true state of prior art described above, we made a diligent study in search of a method for agglomeration which comprises subjecting an absorbent resin powder to continuous agglomeration thereby attaining elimination of minute particles contained in the resin powder and an apparatus for execution of the method. We consequently acquired a knowledge that from an absorbent resin powder containing minute particles, an absorbent resin powder of high quality possessing particle sizes in a desired range is obtained by causing the resin powder and an aqueous liquid separately dispersed in advance with the current of air to flow down a cylindrical member from the upper part to the lower part thereof and come into parallel flow contact during the descent thereby inducing cohesive union of the absorbent resin powder containing minute particles and optionally crushing coarse clusters possibly formed in consequence of the union. This invention has been perfected as a result.

An object of this invention, therefore, is to provide a method for continuous agglomeration which accomplishes elimination of minute particles contained in an absorbent resin powder by agglomerating the individual particles of the absorbent resin powder by cohesive union with an aqueous liquid as a binder while avoiding mutual collision thereof and optionally crushing coarse particles possibly formed by the cohesive union and an apparatus for the execusion of this method.

DISCLOSURE OF INVENTION

The object described above is accomplished by a method for continuous agglomeration of an absorbent resin powder characterized by introducing the absorbent resin powder into a cylindrical member having an open lower end by means of a current of air through a dispersing member disposed in the upper part of the cylindrical member and, at the same time, spraying minute droplets of an aqueous liquid downwardly through a nozzle disposed inside the dispersing member thereby establishing mutual parallel flow contact between the absorbent resin powder descending toward the lower part of the cylindrical member as dispersed with the current of air and the liquid droplets descending toward the lower part of the cylindrical member as diffused in the radial direction, removing the produced agglomerate having a plurality of particles of the absorbent resin powder cohesively united through the medium of the liquid droplets through the lower part of the cylindrical member, and optionally crushing the removed agglomerate.

The object is further accomplished by an apparatus for continuous agglomeration of an absorbent resin powder, comprising a cylindrical member provided with temperature control means and having an open lower end, hopper-shaped absorbent resin powder dispersing means disposed in the upper part of the cylindrical member and provided with air current generating means, means disposed at a position inside the absorbent resin powder dispersing means and adapted to spray droplets of an aqueous liquid parallelly to the direction of descent of the resin powders and means disposed in the proximity of the open lower end of the cylindrical member and adapted to withdraw agglomerate having a plurality of particles of the absorbent resin powder cohesively united through the medium of the liquid droplets.

BEST MODE FOR CARRYING OUT THE INVENTION

In accordance with this invention, the cohesive union of a plurality of particles of an absorbent resin powder attained through the medium of droplets of an aqueous liquid as a binder inside a cylindrical member enlarges minute particles of the resin powder having particle sizes below a prescribed level into a resin powder having particle sizes above the prescribed level and consequently effects elimination of the minute particles from the resin powder. During the formation of agglomerate by cohesive union, the absorbent resin powder containing the minute particles is introduced downwardly into the cylindrical member as dispersed with a current of air through a dispersing member disposed in the upper part of the cylindrical member and, at the same time, the droplets of the aqueous liquid are sprayed through a nozzle disposed inside the dispersing member so as to give rise inside the cylindrical member to a region in which the resin powder and the liquid droplets come into mutual parallel flow contact in such a state that the individual particles of the resin powder avoid frequent mutual collision. The agglomerate are formed in consequence of the contact and cohesive union of the plurality of particles of the resin powder through the medium of the liquid droplets. At this time, since the absorbent resin powder is fully susceptible to agglomerate, no strong collision is required between the resin powder and the liquid droplets or between the individual particles of the resin powder wetted with liquid droplets and readied for cohesive union into agglomerate. As a result, the absorbent powder acquires particle sizes above the prescribed level without infliction of injury or fracture upon the particles of the resin powder or damage upon the surface of the particles.

The agglomerate resulting from the cohesive union may be put in their unmodified form to use as a finished product as incorporated in sanitary articles and water-retaining agents. Preferably for the purpose of improvement of the convenience of handling, the agglomerate just produced by the procedure described above are further crushed preparatorily to use. This crush does not give rise to any minute particle at all but comminutes coarse agglomerate. Thus, the produced absorbent resin powder comprises particles which measure above a desired particle size and contains no coarse particles.

When the aqueous liquid is used in a large amount during the course of the continuous agglomeration, the produced agglomerate formed of cohesively united particles possibly acquire a viscous surface. The agglomerate having a viscous surface are preferably to have this unwanted viscosity diminished by being left standing for a prescribed duration or being heated before they are crushed. In this case, the agglomerate do not always necessitate intentional drying. This heating is preferably carried cut at a temperature in the range of from 50° to 200° C. for a period in the range of from 3 minutes to 12 hours. Preferably, the heating temperature is from 70° to 120° C. and the heating time is from 10 minutes to 2 hours.

The term "absorbent resin powder" as used in this invention refers to a resin powder which shows virtually no solubility in water, swells with absorbed water, and possesses a water absorption ratio of not less than 1,000%, preferably not less than 5,000%. The method of this invention is effective particularly in the agglomeration of an absorbent resin powder having a conspicuously high water absorption ratio.

The absorbent resins which answer this description include a hydrolyzed starch-acrylonitrile graft copolymer (JP-B-49-43,395), a neutralized starch-acrylic acid graft polymer (JP-B-53-46,199 JP-B-55-21,041), saponified acrylic ester-vinyl acetate copolymers (JP-B-53-13,495 JP-B-55-19,243), a modified cross-linked polyvinyl alcohol (JP-A-54-20,093), a cross-linked partially neutralized polyacrylic acid (JP-A-55-84,304, JP-A-56-93,716, JP-A-56-161,408, and JP-A-58-71,907), and a cross-linked isobutylene-maleic anhydride copolymer (JP-A-56-36,504), for example.

The absorbent resin is usable in the form uniformly cross-linked throughout the entire volume thereof or in the form having the surface thereof cross-linked as disclosed in JP-A-58-180,233, JP-A-58-117,222, and JP-A-58-42,602. Though this invention makes no discrimination between the two forms mentioned above, the latter form fits the method of this invention.

The absorbent resin powder is desired to have a particle size distribution such that those of the particles of the resin powder which pass a standard 100-mesh sieve (particles having dimeter under 0.15 mm) account for a proportion of not more than 50% by weight, based on the total amount of the particles. If this proportion is not less than 50% by weight, the amount of resin powder particles which escape cohesive union in the cylindrical member increases to an excessive extent. If the cohesive union is dared in spite of this adversity, the consumption of the aqueous liquid inevitably increases and the fast adhesion of resin powder to the apparatus heavily occurs and, as a result, the continuous size enlargement fails to proceed. Further, when the absorbent resin powder includes the aqueous liquid in a large amount, it is compelled to sacrifice its quality as a toll.

The aqueous liquid for use in this invention may be either water in its simple form or a liquid mixture of water with an organic solvent which is miscible with water. The organic solvents which exhibit miscibility with water include lower alcohols, tetrahydrofuran, and acetone, for example. The water in its simple form or the liquid mixture mentioned above may optionally incorporate therein various compounds or mixtures as dissolved or dispersed therein preparatorily to use. The compounds or mixtures which are usable for this incorporation include a slurry of microfine silica besides the deodorants and plant growth accelerators which are enumerated in JP-A-61-97,333, for example.

The amount of the aqueous liquid to be used in this invention need not be particularly restricted but may be selected in a wide range. No conspicuously effective agglomeration is easily obtained if the amount is unduly small. Conversely, if this amount is unduly large, the agglomerate produced in consequence of the agglomeration possibly suffer a decline in the capacity for absorption when no step for drying follows the step for agglomeration. Generally, the amount of the aqueous liquid desirably falls in the range of from 1 to 50 parts by weight, preferably in the range of from 3 to 35 parts by weight, based on 100 parts by weight of the absorbent resin powder.

The minute droplets of the aqueous liquid to be used in this invention are preferable to have an average diameter of not more than 300 $\mu$m, preferably not more than 250 $\mu$m. Generally, this average diameter is in the range of from 50 to 200 $\mu$m. If the average diameter exceeds 300 $\mu$m, since the aqueous liquid is uniformly diffused or dispersed only with difficulty, the disadvantage ensues that the resin powder forms lumps of high density and the amount of minute particles of the resin powder which survive the agglomeration in the cylindrical member unduly increases. This unduly large average diameter, therefore, is the last thing to be desired. The methods which are effectively usable for the formation of minute liquid droplets having an average diameter of not more than 300 $\mu$m include the rotary disc method, the pressure nozzle method, and the two-phase flow nozzle method, for example. Since this invention contemplates introducing the absorbent resin powder downwardly into the cylindrical member from the top thereof, the two-phase flow nozzle fits the method of this invention because it is capable of precluding the possible deposition of agglomerate on the liquid sprayer by the injection of a gas. The two-phase flow nozzle (produced by Fuyo Seiki K.K. and marketed under trademark designation of "Luminar") and the spray vector (produced by Kobe Chutetsu K.K.) are typical examples of the two-phase flow nozzle. When the absorbent resin powder and the droplets of aqueous liquid mentioned above are caused to flow down the interior of the cylindrical member as diffused or dispersed from the upper part thereof, pluralities of resin particles are severally united cohesively through the medium of liquid droplets to form agglomerate large in particle diameter. Then, these agglomerate are thrown into a crushing device and pulverized therein by crushing. The commercially available crushing devices which are effectively usable for this pulverization include New Speed Mill (a proprietary product of Okada Seiko K.K.), Flush Mill (a proprietary product of Fuji Powder K.K.), and Speed Mill (a proprietary product of Showa Engineering K.K.), which are enumerated in JA-A-61-97,333 for example. This pulverization by crushing may be carried out immediately after the agglomeration by cohesive union within the cylindrical member or after the elapse of a prescribed time following the agglomeration, whichever may be convenient.

The introduction of the absorbent resin powder into the cylindrical member is effected by causing this resin powder to fall down the interior of the cylindrical member as kept in a diffused or dispersed state. For the absorbent resin powder to be uniformly introduced into the cylindrical member, it is preferable to be dispersed and advanced with a current of air into the cylindrical member.

A current of compressed air from air current generating means is blown against the absorbent resin powder being introduced via the introducing member. The resin powder is caused by the action of this current of compressed air to flow down the interior of the cylindrical member. Generally, this current is formed of air. The mixing ratio of the absorbent resin powder to the air current in this case is preferable to fall in the range of from 0.1 to 5 kg/Nm$^3$, preferably from 0.5 to 2 kg/Nm$^3$. They must be thoroughly dispersed before they contact the liquid droplets. If the amount of the absorbent resin powder is such that the mixing ratio exceeds 5 kg/Nm$^3$, the dispersion or diffusion of the absorbent resin powder caused by the air current is not sufficient and, as a result, the uniformization of the contact between the resin powder and the droplets of aqueous liquid is not attained as desired. Thus, the amount of minute particles of the resin powder which remain intact after the agglomeration is unduly large. Conversely, if the aforementioned mixing ratio is less than 0.1 kg/Nm$^3$, the operation of agglomeration itself is economically impracticable because the amount of a gaseous material to be introduced to the site of size enlargement is so huge as to necessitate installation of an unduly large device for discharge of the used gaseous material. If the discharge of the used gaseous material is not sufficient, the continuous agglomeration is attained with difficulty because of an increase in the amount of the agglomerate of cohesively united particles suffered to adhere to the inner wall surface of the cylindrical member. The retention time of the air current in the cylindrical member is fixed by controlling the flow rate of the air current and the aforementioned mixing ratio of the air current and the absorbent resin powder. This retention time of the air current is preferable to be set somewhere in the approximate range of from 0.1 to 30 seconds, preferably from 5 to 15 seconds.

The inner wall of the cylindrical member is preferable to be provided with warmth-retaining means adapted to keep the temperature of the inner wall in the range of from 50° to 200° C., preferably from 70° to 200° C. The maintenance of the inner wall temperature in the range mentioned above is attained, for example, by covering the cylindrical member with a jacket and circulating steam through this jacket. The heating with the jacket serves to prevent agglomerate of cohesively united particles from fast deposition on the inner surface of the cylindrical member.

The position for introducing the absorbent resin powder and the position for spraying the aqueous liquid in the form of minute droplets are fixed as follows. The absorbent resin powder is introduced downwardly by means of the air current as dispersed into the cylindrical member through the dispersing member disposed in the upper part of the cylindrical member and the minute droplets of the aqueous liquid are sprayed downwardly from a nozzle disposed inside the dispersing member, preferably substantially at the center of the dispersing member.

In this case, the absorbent resin powder which has been introduced into the cylindrical member is caused to flow down the interior of the cylindrical member by the weight of its own coupled with the air current for dispersion and the air current containing the liquid droplets emanating from the nozzle. In this case, the absorbent resin powder only flows down the interior of the cylindrical member from the upper part to the lower part of the cylindrical member and avoids inducing such powerful mutual collision of the individual particles of the resin powder as to inflict damage to the individual particles. The minute liquid droplets which have been sprayed from the nozzle are caused to flow down the interior of the cylindrical member as dispersed by the spraying force coupled with the weight of their own. Since the absorbent resin powder flows down from the upper part to the lower part and, at the same time, the droplets of aqueous liquid similarly flow down the interior of the cylindrical member as diffused at a prescribed angle relative to the radial direction of the cylindrical member. the resin powder and the aqueous liquid come into mutual parallel flow contact. Thus, pluralities of resin particles are severally united cohesively through the medium of the droplets adhering as a binder to the resin particles to give birth to agglomerate of cohering resin particles.

The nozzle for spraying the aqueous liquid is disposed inside the dispersing member for the absorbent resin powder, preferably substantially at the center of the dispersing member. If the nozzle is disposed outside the dispersing member, no uniform contact is established between the absorbent resin powder and the aqueous liquid and the produced agglomerate of cohering particles copiously contain minute particles remaining intact after the size enlargement as well as clusters of cohering particles wetted with absorbed water.

The nozzle so disposed has the disadvantage that since the droplets of aqueous liquid are diffused and consequently suffered to wet the inner wall of the cylindrical member, the amount of the agglomerate of cohering particles of the absorbent resin powder deposited on the inner wall increases even to the extent of obstructing fulfilment of the primary object of continuous agglomeration.

The agglomerate produced by cohesive union of a plurality of particles of the absorbent resin powder through the medium of the aqueous liquid are received as on a conveyor belt installed below the cylindrical member and conveyed as carried thereon to the next step.

As the cylindrical member, a cylinder having a tetragonal or more polygonal cross section can be used. Otherwise, a cylinder having a conical or prismatic shape can be used. Among other cylinders, the cylinder having a circular shape is used particularly desirably.

Further, the absorbent resin powder to be used in this invention, for the sake of improvement in flowability, may preparatorily incorporate therein finely particulate silica or, for the purpose of enhancing lightfastness and acquiring a deodorizing effect, may incorporate therein carbon black and/or activated carbon in advance of the treatment for agglomeration. The term "particulate silica" refers to a substance formed mainly of silicon dioxide particles not more than 50 $\mu$m in average diameter. Aerosil 200 (a proprietary product of Japan Aerosil K.K.) and Carplex #80 (a proprietary product of Shionogi & Co., Ltd.) may be cited as typical examples of the particulate silica.

The amount of this particulate silica to be used is in the range of from 0 to 20 parts by weight, preferably from 0.1 to 5 parts by weight, based on 100 parts by weight of the absorbent resin powder. If this amount is increased beyond the upper limit 20 parts by weight, the excess does not bring about any proportionate addition to the effect but rather jeopardizes the high absorbability of the resin powder or at times renders the agglomeration difficult.

As the carbon black and/or the activated carbon mentioned above, ordinary particulate products available under such designations in the market may be used. The amount of the carbon black and/or the activated carbon to be used is in the range of from 0 to 50 parts by weight, preferably from 0.1 to 10 parts by weight, based on 100 parts by weight of the absorbent resin powder. If this amount is increased beyond the upper limit 50 parts by weight, the excess brings about an adverse effect of jeopardizing the high absorbability of the produced agglomerate of cohesively united particles.

When the absorbent resin powder containing the particulate silica is put to use, the aqueous liquid is preferable to be used in an amount falling in the range of from 1 to 50 parts by weight, preferably from 3 to 35 parts by weight, based on 100 parts by weight of the combined amount of the two powders as when the incorporation of the particulate silica is omitted. Similarly when the absorbent resin powder containing the carbon black and/or the activated carbon is put to use, the aqueous liquid is preferable to be used in the same amount as described above.

Now, the present invention will be described in detail below with reference to working examples. It should be noted, however, that the scope of this invention is not limited to these working examples. Wherever percents and parts are mentioned in the following working examples, they shall be construed as percents by weight and parts by weight respectively unless otherwise specified.

EXAMPLE 1

A jacketed twin-arm type kneader of stainless steel having an inner volume of 10 liters, containing an opening part 220×260 mm in area, measuring 240 mm in depth, and provided with two sigma type vanes 120 mm in rotary diameter was furnished with a lid. In this kneader, 5,500 g of an aqueous solution of an acrylic monomer mixture (monomer concentration 37% by weight and neutralization ratio 75 mol %) comprising 4,380 g of an aqueous sodium acrylate solution, 414 g of acrylic acid, and 706 g of deionized water and 3.4 g of trimethylol propane triacrylate were placed and nitrogen gas was blown in to displace the air entrapped in the reaction system. Then, the two sigma type vanes were set rotating at a rate of 56 rpm, the circulation of hot water at 35° C. through the jacket was started to heat the kneader contents, and 2.8 g of ammonium persulfate and 0.14 g of l-ascorbic acid were added meanwhile to the kneader as polymerization initiators. The monomer mixture began to polymerize 5 minutes after the addition of the initiators. When the internal temperature of the reaction system reached 83° C. after the elapse of 20 minutes thence, the resultant hydrated gel was already in the form of minute particles about 5 mm in diameter. The polymerization was completed in 60 minutes. Then, a hydrated gel-like polymer was removed from the kneader.

The hydrated gel-like polymer was spread out in a thickness of 50 mm in a hot air drier and dried therein with hot air at a temperature of 150° C. for 90 minutes to afford a absorbent resin having a water content of not more than 10% by weight. This absorbent resin was pulverized with a hammer type pulverizing device and sifted with a 20-mesh metallic net to obtain an absorbent resin (1).

By mixing 100 parts by weight of the absorbent resin (1) with a liquid substance comprising of 0.5 part by weight of glycerol, 2 parts by weight of water, and 6 parts by weight of methanol, heat-treating the resultant mixture, and sifting the heated mixture, an absorbent resin powder (A-1) was obtained as a 20-mesh pass.

100 parts by weight of the absorbent resin powder (A-1) and 6 parts by weight of water supplied thereto were subjected to continuous agglomeration in accordance with the following procedure.

Figure 1:
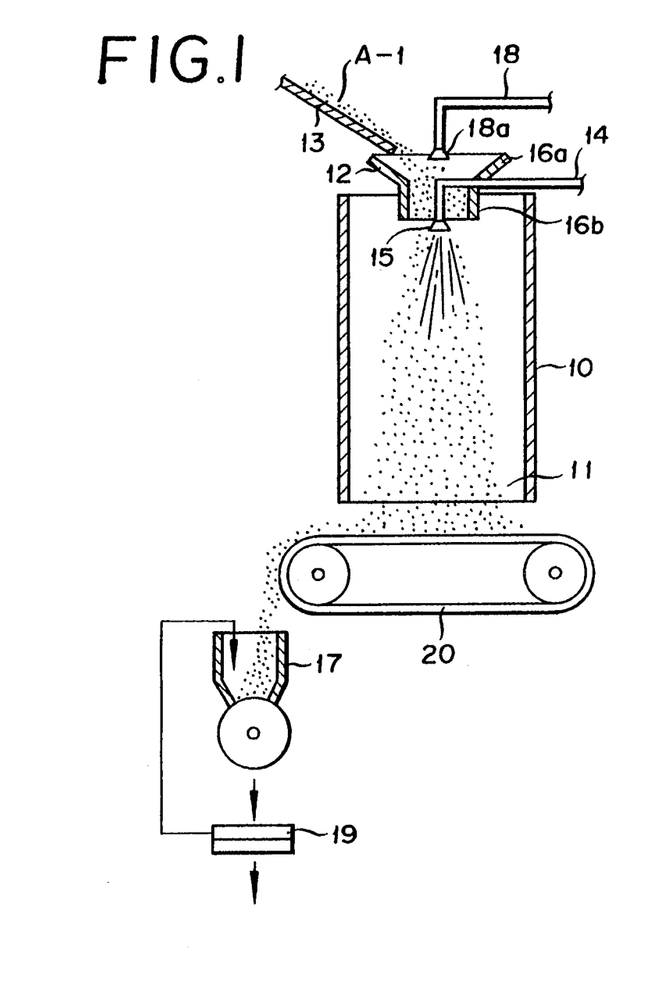
FIG. 1 is a cross section illustrating an apparatus for working a method for continuous agglomeration of an absorbent resin powder as one embodiment of the present invention.

Specifically as illustrated in FIG. 1, a cylindrical body 10 provided at the lower end thereof with an opening part 11 was installed as erected upright. This cylindrical body 10 was provided in the upper central part thereof with a hopper-like dispersing member 12 which comprises a tapered part 16a radially diminishing downwardly and a straight part 16b extending downwardly from the lower end part of the tapered part 16a.

Compressed air emanating from air current generating means formed of a nozzle 18a at the leading terminal of an air compressing pipe 18 was blown against the absorbent resin powder (A-1) thrown onto the upper surface of the tapered part 16a through an introducing member 13, with the result that the absorbent resin powder (A-1) was caused by dint of the weight of its own and the action of the air current to diffuse in the radial direction of the cylindrical body 10 and, at the same time, flow down the interior of the cylindrical body 10.

A pipe 14 was fixed at the central part of the dispersing member 12. A nozzle 15 was attached to leading terminal of the pipe 14 as disposed below dispersing member 12. Air and water were simultaneously spouted through the nozzle 15 so that the water was sprayed in the form of minute droplets downwardly inside the cylindrical body 10. The sprayed water droplets flowed down the interior of the cylindrical body 10 as kept diffusing in the radial direction of the cylindrical body 10. By the adjustment of the nozzle and the absorption of water in the absorbent resin powder, the diffusion of the water droplets in the radial direction of the cylindrical body 10 did not exceed that of the absorbent resin powder at any position in the direction of height of the cylindrical body 10. The water droplets during the descent were absorbed by the absorbent resin powder so that virtually no sign of the presence of such water droplets was found at the lower terminal of the cylindrical body 10. At this time, the mixing ratio of the absorbent resin powder (A-1) to the air current was found to be 2 kg/Nm$^3$. The average diameter of the water droplets was about 100 $\mu$m. The retention time of the absorbent resin powder in the cylindrical body 10 was 10 seconds. By externally heating the cylindrical body 10, the temperature of the inner wall thereof was kept at 90° C. The agglomerate of cohering resin particles consequently obtained were conveyed to a pulverizing device 17 (produced by Fuji Powder K.K. and marketed under trademark designation of "Flush Mill") with a bucket conveyor 20. A hot air kept at about 90° C. was blown against the bucket conveyor 20 to lower the viscosity of the agglomerate during about 20 minutes retention time thereof. The agglomerate of cohering particles thrown in the pulverizing device 17 were pulverized by crushing. The pulverized agglomerate were sifted with a sieve 19 to obtain an aggregated powder (1) as a 20-mesh pass. The aggregated powder was tested for (a) absorption ratio, (b) absorption ratio under pressure, (c) suction power, and (d) viscosity distribution as follows.

(a) Absorption ratio

A sample, 0.2 g in weight, of the absorbent resin powder (A-1) or the aggregated powder (1) was uniformly placed in a tea bag-like pouch (40 mm×150 mm) made of nonwoven fabric, immersed in an aqueous 0.9% saline solution for 30 minutes, and then weighed. The tea bag-like pouch empty of the sample was weighed as a blank. The absorption ratio of the size-enlarged powder (1) was calculated in accordance with the following formula.

Absorption ratio (g/g)=(Weight of wet pouch (g)−Blank (g))/(Weight of absorbent resin (g))

(b) Absorption ratio under pressure

Figure 4:
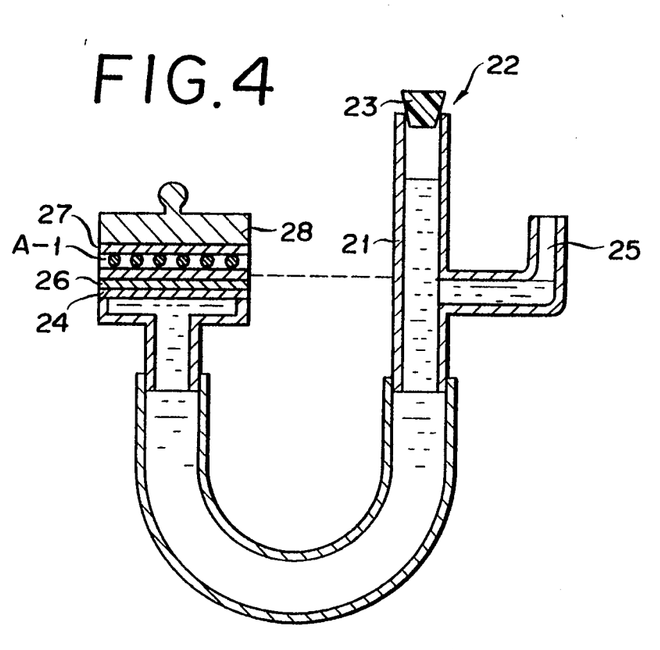
FIG. 4 is a cross section illustrating a device for determining the absorption ratio of a sample kept under pressure.

The absorption ratio of a sample under pressure was determined by the use of a device illustrated in FIG. 4. A stopper 23 fitted in an upper mouth 22 of a burette 21 and a measuring stand 24 and an air inlet 25 were set flush with each other. On a glass filter (No. 1) 70 mm in diameter disposed in the measuring stand 24, a filter paper, a sample 0.2 g in weight of the absorbent resin powder (A-1) or the aggregated powder (1), and a paper filter 27 were superposed and a weight 28 of 20 g/cm$^2$ was further superposed. The sample was left absorbing an artificial urine (containing 1.9% of urea, 0.8% of NaCl, 0.1% of CaCl$_2$, and 0.1% of MgSO$_4$) for 30 minutes thence. The amount of the artificial urin consequently absorbed by the sample was reported in ml/g.

(c) Suction power

A substrate containing artificial urine was prepared by adding 20 ml of artificial urine onto a tissue paper (55 mm×75 mm). On this substrate, a sample 1.0 g in weight of the absorbent resin powder (A-1) or the aggregated powder (1) was placed. After the elapse of 10 minutes thence, a swelled gel consequently formed was collected and weighed. The weight of the swelled gel was reported as the sample's suction power of the artificial urine from the tissue paper.

(d) Particle size distribution

On a classifier formed by superposing 20-mesh, 50-mesh, and 100-mesh standard sieves 70 mm in diameter on a receptacle plate underlaid by a classifying plate, a sample 30 g in weight of the absorbent resin powder (A-1) or the aggregated powder (1) was placed and shaken with a classifying device for 10 minutes. The fractions of the sample consequently classified were weighed and reported in % by weight.

Figure 2:
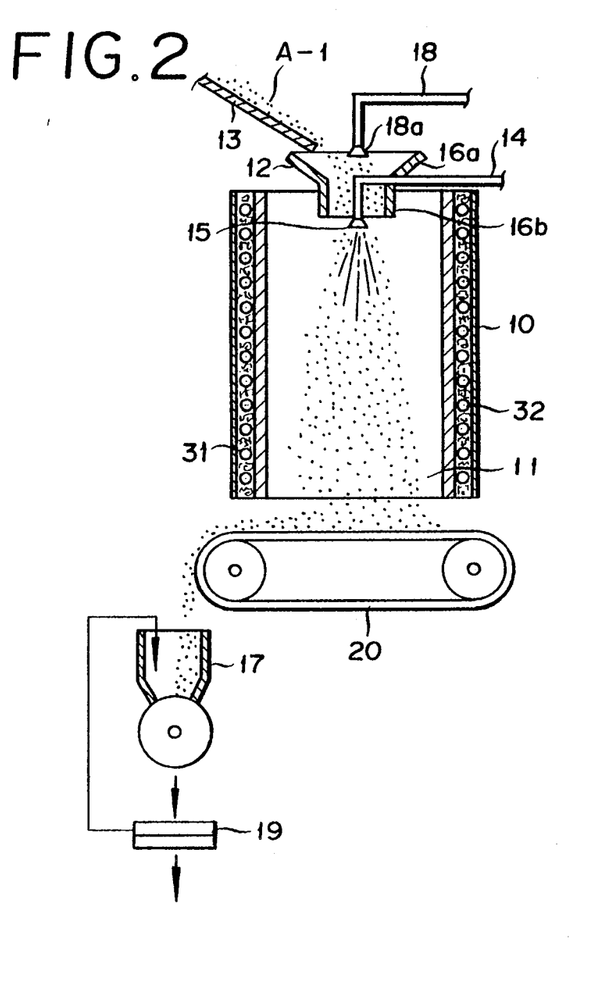
FIG. 2 is a cross section illustrating an apparatus as another embodiment of this invention.

FIG. 2 illustrates an apparatus identical with the apparatus of FIG. 1 except for the incorporation of temperature controlling means 33 formed of an insulating member 32 of glass wool, phenol resin wool, or asbestos having embedded therein a coil 31 for conveying a thermal medium such as steam. The other numerical references used in FIG. 2 are identical to those used in FIG. 1.

Control 1

In a high-speed rotary paddle type mixer (produced by Hosokawa Micron K.K. and marketed under trademark designation of "Turburizer"), 100 parts by weight of the absorbent resin powder (A-1) obtained by the procedure of Example 1 and 6 parts by weight of water were mixed. From the resultant agglomerate of cohering particles, an aggregated powder (1) as a 20-mesh pass for comparison was obtained by following the procedure of Example 1. The aggregated powder (1) for comparison was tested in the same manner as in Example 1.

EXAMPLES 2 to 5

Size-enlarged powders (2) to (5) were produced by following the procedure of Example 1, except that the temperature of the inner wall of the cylindrical body, the mixing ratio of the absorbent resin powder (A-1) to the air current, the retention time of the air current in the cylindrical body, and the average diameter of the water droplets were varied as shown in Table 2. They were tested in the same manner as in Example 1. The results are shown in Table 2.

EXAMPLE 6

In a reaction vessel provided with a stirrer, a nitrogen gas inlet tube, and a thermometer, 50 parts by weight of corn starch, 200 parts by weight of water, and 1,000 parts by weight of methanol were placed, stirred as swept with nitrogen gas at 50° C. for 1 hour, and cooled to 30° C. The resultant mixture and 25 parts by weight of acrylic acid, 75 parts by weight of sodium acrylate, 0.5 part by weight of methylene bisacrylamide, 0.1 part by weight of ammonium persulfate as a polymerization catalyst, and 0.1 part by weight of sodium hydrogen sulfite as an accelerator added thereto were left reacting at 60° C. for 4 hours. Consequently, a white suspension was obtained.

The powder obtained by filtering this white suspension was washed with a water-methanol mixed solution (weight ratio of water to methanol 2:10), vacuum dried at 60° C. for 3 hours, then pulverized, and sifted through a 20-mesh metallic sieve, to obtain a 20-mesh pass (absorbent resin (2)).

100 parts by weight of the absorbent resin (2) was mixed with a liquid mixture comprising 1 part by weight of glycerol and 8 parts by weight of methanol. The resultant mixture was heat-treated and subjected to the procedure of Example 1, to afford an absorbent resin powder (A-2) as a 20-mesh pass.

From this absorbent resin powder (A-2), an aggregated powder (6) was obtained as a 20-mesh pass by following the procedure of Example 1, except that 20 parts by weight of water was supplied to 100 parts by weight of the resin powder (A-2). The aggregated powder (6) was left drying at 105° C. for 3 hours and then tested.

EXAMPLE 7

A copolymer was produced by preparing a mixture comprising 60 parts by weight of vinyl acetate and 40 parts by weight of methyl acrylate, adding 0.5 part by weight of benzoyl peroxide as an initiator to the mixture, dispersing the resultant product of addition in 300 parts by weight of water containing 3 parts by weight of partially saponified polyvinyl alcohol and 10 parts by weight of sodium chloride, subjecting the resultant dispersion to suspension polymerization at 65° C. for 6 hours, separating the resultant polymer by filtration, and drying the separataed copolymer. The copolymer thus obtained was saponified, washed, dried, pulverized, and classified, to afford a 20-mesh pass (absorbent resin (3)).

The absorbent resin (3) obtained consequently was heat-treated in the same manner as in Example 6, to afford an absorbent resin powder (A-3). An aggregated powder (7) was obtained as a 20-mesh pass by subjecting the absorbent resin powder (A-3) to the procedure of Example 1, except that 35 parts by weight of water was supplied to 100 parts by weight of the absorbent resin powder (A-3). The aggregated powder (7) was left drying at 105° C. for 3 hours and then tested.

EXAMPLE 8

The absorbent resin powder (A-1) was subjected to the procedure of Example 1, except that an aqueous solution containing 15% of the extract of a plant of family Theaceae (produced by Shiraimatsu Shinyaku K.K. and marketed under trademark designation of "NI Fleska 800 MO") as a deodorant was used in the place of the water in the same amount, to afford a size-enlarged powder (8).

EXAMPLE 9

A mixed powder P was obtained by thoroughly mixing 100 parts by weight of the absorbent resin powder (A-1) obtained in Example 1 with 1 part by weight of a finely particulate silica (produced by Nippon Aerosil K.K. and marketed under trademark designation of "Aerosil 200"). The mixed powder P was subjected to the procedure of Example 1, except that 10 parts by weight of water was supplied to 100 parts by weight of the mixed powder P, to afford an aggregated powder (9).

EXAMPLE 10

A mixed powder Q was obtained by thoroughly mixing 100 parts by weight of the absorbent resin powder (A-1) obtained in Example 1 with 4 parts by weight of carbon black (produced by Mitsubishi Chemical Industries, Ltd. and marketed under trademark designation of "Mitsubishi Carbon Black #600").

The mixed powder Q was subjected to the procedure of Example 1, except that 10 parts by weight of water was supplied to 100 parts by weight of the mixed powder Q, to afford a size-enlarged powder (10).

Control 2

Figure 3:
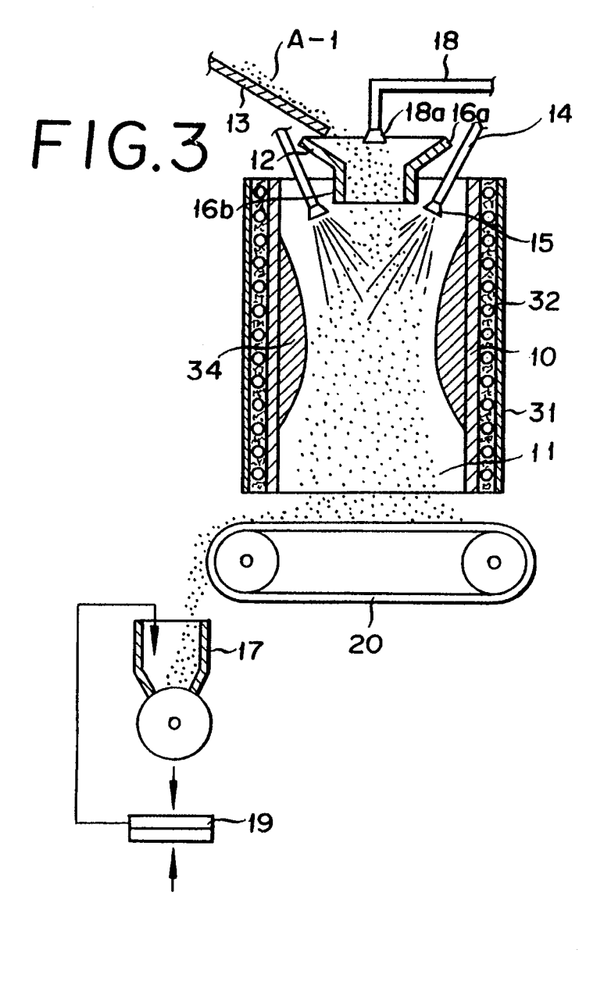
FIG. 3 is a cross section illustrating an apparatus as a control.

By following the procedure depicted in FIG. 3, 100 parts by weight of the absorbent resin powder (A-1) were subjected to size enlargement. FIG. 3 illustrates an apparatus which is identical with the apparatus of FIG. 1, except two nozzles 15 for simultaneous injection of air and water were disposed at two positions outside the dispersing member 12 as posed obliquely in a downward direction. The other reference numerals used in FIG. 3 are identical to those used in FIG. 1. In this apparatus, the continuous agglomeration could not be attained because a deposit 34 formed on the wall was quite large. By subjecting the resultant agglomerate of cohering particles to the same treatment as in Example 1, a an aggregated powder (2) for comparison was obtained as a 20-mesh pass. The size-enlarged powder (2) for comparison was tested. The results are shown in Table 3.

TABLE 1

|  | Example 1 | | Control 1 |
|---|---|---|---|
|  | Absorbent resin powder (A-1) | Aggregated powder (1) | Aggregated powder for comporison (1) |
| Absorption ratio (g/g) | 42 | 40 | 40 |
| Absorption ratio under pressure (ml/g) | 25 | 24 | 20 |
| Suction power (g/g) | 16.3 | 16.3 | 15.4 |
| Particle size distribution (%) | | | |
| 20 mesh on | 0 | 0 | 0 |
| 20~50 mesh | 53 | 62 | 60 |
| 50~100 mesh | 28 | 29 | 30 |
| 100 mesh thru | 19 | 9 | 10 |

TABLE 2

|  | Example 2 Aggregated powder (2) | Example 3 Aggregated powder (3) | Example 4 Aggregated powder (4) | Example 5 Aggregated powder (5) |
|---|---|---|---|---|
| Inner wall temperature (°C.) | 90 | 22 | 90 | 90 |
| Mixing ratio (kg/Nm$^3$) | 3 | 1 | 8 | 1 |
| Retension time (sec) | 20 | 10 | 10 | 10 |
| Average Liquid droplet diameter ($\mu$) | 200 | 100 | 100 | 1000~2000 |
| Absorption ratio (g/g) | 40 | 40 | 40 | 40 |
| Absorption ratio under pressure (ml/g) | 24 | 23 | 23 | 23 |
| Suction power (g/g) | 16.0 | 15.9 | 16.0 | 15.8 |
| Particle size distribution (%) | | | | |
| 20 mesh on | 0 | 0 | 0 | 0 |
| 20~50 mesh | 63 | 61 | 54 | 55 |
| 50~100 mesh | 27 | 28 | 32 | 32 |
| 100 mesh thru | 10 | 11 | 14 | 13 |
| Appearance of Agglomeration Operation | satisfactory | Deposition of particles to inner wall observed. Deposited particles hard and inferior in properties | Lack of uniformity found in agglomerated particles | Lack of uniformity found in agglomerated particles | obtained in Example 1 and 6 parts by weight of water

TABLE 3

|  | Example 6 | | Example 7 | | Example 8 Aggregated powder (8) | Example 9 Aggregated powder (9) | Example 10 Aggregated powder (10) | Control 2 Aggregated powder for comprison (2) |
|---|---|---|---|---|---|---|---|---|
|  | Absorbent resin powder (A-2) | Aggregated powder (6) | Absorbent resin powder (A-3) | Aggregated powder (7) | | | | |
| Absorption (g/g) | 38 | 36 | 36 | 34 | 40 | 42 | 38 | 38 |
| Absorption ratio under pressure (ml/g) | 18 | 17 | 20 | 19 | 24 | 23 | 22 | 20 |
| Suction power (g/g) | 15.6 | 15.3 | 15.8 | 15.8 | 16.2 | 15.3 | 15.9 | 15.0 |
| Particle size distribution (%) | | | | | | | | |
| 20 mesh on | 0 | 0 | 0 | 0 | 0 | 0 | 0 | 0 |

TABLE 3-continued

|  | Example 6 | | Example 7 | | Example 8 Aggregated powder (8) | Example 9 Aggregated powder (9) | Example 10 Aggregated powder (10) | Control 2 Aggregated powder for comprison (2) |
|---|---|---|---|---|---|---|---|---|
|  | Absorbent resin powder (A-2) | Aggregated powder (6) | Absorbent resin powder (A-3) | Aggregated powder (7) | | | | |
| 20~50 mesh | 11 | 25 | 31 | 48 | 62 | 63 | 62 | 53 |
| 50~100 mesh | 54 | 68 | 41 | 47 | 28 | 28 | 28 | 34~28 |
| 100 mesh thru | 35 | 7 | 28 | 5 | 10 | 9 | 10 | 13~19 |
| Appearance of Agglomeration Operation | Satisfactory | | Satisfactory | | Satisfactory | Satisfactory | Satisfactory | Heavy deposition of particles to inner wall prevented continuation of separation. Deposited particles hard and inferior in properties. Lack of uniformity found in agglomerated paticles. |

Industrial Applicability

In accordance with this invention, an absorbent resin powder and aqueous liquid droplets both dispersed with a current of air were caused to flow down the interior of a cylindrical member erected upright from the upper end thereof and the resin powder and the liquid droplets during their descent toward the lower part of the cylindrical member are therefore brought into mutual parallel flow contact and, as a result, groups of a plurality of particles of the resin powder are coherently joined through the medium of the liquid droplets while avoiding mutual collision of the individual particles of the resin powder and not relying on any mechanical shearing force. The formation of agglomerate of cohering particles, therefore, proceeds without causing fine division of the resin powder or infliction of fracture on the surface of the resin powder. Thus, the produced absorbent resin powder contains no minute particle and enjoys an ideal quality. Further, since the agglomerate of cohering particles can be obtained by simply causing the absorbent resin powder to flow continuously down the interior of the cylindrical member and since the produced agglomerate can be subjected to pulverization by crushing without preparatorily undergoing a drying step, the absorbent resin powder can be continuously produced with a high operational efficiency.

In accordance with the method of this invention, the occurrence of dust and the degradation of a working environment which generally are not avoidable in the use of a resin powder can be precluded because the absorbent resin powder of this invention is not suffered to contain minute particles. Particularly when the resin powder has the surface thereof subjected to a cross-linking treatment for the sake of improvement of the quality thereof, the surface layer formed on the resin powder in consequence of the crosslinking treatment remains intact and the produced absorbent resin powder enjoys high quality because the individual particles of the resin powder are prevented from colliding against one another and sustaining damage due to a mechanical shearing force during the formation of agglomerate of cohering particles within the cylindrical member.

The product of the agglomeration of the absorbent resin powder which is obtained as described above can be extensively utilized in sanitary articles such as sanitary napkins and disposable diapers, water-retaining agents for agriculture, and desiccants, for example.

We claim:

1. A method for continuous agglomeration of an absorbent resin powder, which comprises the steps of introducing said absorbent resin powder into a cylindrical member having an open lower end by means of a current of air through a dispersing member disposed in the upper part of said cylindrical member and, at the same time, spraying minute droplets of an aqueous liquid downwardly through a nozzle disposed inside said dispersing member thereby establishing mutual parallel flow contact between said absorbent resin powder descending toward the lower part of said cylindrical member as dispersed with said current of air and said liquid droplets descending toward the lower part of said cylindrical member as diffused in the radial direction, and removing the consequently produced agglomerate having groups of a plurality of particles of said absorbent resin powder cohesively united through the medium of said liquid droplets via the lower part of said cylindrical member.

2. A method according to claim 1, wherein said agglomerate of cohering particles removed from the lower part of said cylindrical member are subjected to pulverization by crushing.

3. A method according to claim 1 or claim 2, wherein the temperature of the inner wall of said cylindrical member is kept in the range of from 50° to 200° C. by the use of temperature control means disposed in said cylindrical member.

4. A method according to any of claims 1 to 3, wherein said cylindrical member has a circular cross section.

5. A method according to any of claims 1 to 4, wherein said nozzle for spraying said liquid droplets is disposed substantially at the center of said dispersing member.

6. A method according to any of claims 1 to 5, wherein the mixing ratio of said absorbent resin powder to said air current is in the range of from 0.1 to 5 kg/Nm³.

7. A method according to claim 6, wherein the retention time of said air current in said cylindrical member is in the range of from 0.1 to 30 seconds.

8. A method according to any of claims 1 to 7, wherein said droplets of said aqueous liquid have an average diameter of not more than 300 μm.

9. A method according to any of claims 1 to 8, wherein the amount of said aqueous liquid to be used is in the range of from 1 to 50 parts by weight, based on 100 parts by weight of said absorbent resin powder.

10. A method according to any of claims 1 to 9, wherein said absorbent resin powder has a particle size distribution such that those of the particles of said resin powder which pass a 100-mesh standard sieve account for a proportion of not more than 50% by weight, based on the total of the particles of said absorbent resin powder.

11. A method according to any of claims 1 to 10, wherein said aqueous liquid has a deodorant dissolved therein.

12. A method according to any of claims 1 to 11 wherein said aqueous liquid has a plant growth accelerator dissolved therein.

13. A method according to any of claims 1 to 12 wherein the amount of said aqeuous liquid is in the range of from 1 to 50 parts by weighty based on 100 parts by weight of the total amount of said absorbent resin powder containing a particulate silica.

14. A method according to any of claims 1 to 13 wherein the amount of said aqueous liquid is in the range of from 1 to 50 parts by weight, based on 100 parts by weight of the total amount of said absorbent resin powder containing at least one member selected from the group consisting of carbon black and activated carbon.

15. An apparatus for continuous agglomeration of an absorbent resin powder, which comprises a cylindrical member provided with temperature controlling means and possessing an open lower end, a hopper-like absorbent resin powder dispersing means disposed in the upper part of said cylindrical member, air current generating means provided in or above said dispersing means, means disposed at a position inside said dispersing means and below said current generating means adapted to spray minute particles of an aqueous liquid parallelly to the direction of descent of said resin powder, and means disposed in the proximity of said open lower end of said cylindrical member and adapted to remove an agglomerated resin powder having groups of a plurality of particles of said absorbent resin powder cohesively joined through the medium of said liquid droplets.

16. An apparatus according to claim 15, which further comprises means for pulverizing said agglomerated resin powder disposed below said means for removal of said agglomerated resin powder.

17. An apparatus according to claim 15 or claim 16, wherein said liquid droplet spraying means is disposed substantially at the center of said absorbent resin powder dispersing means.

18. An apparatus according to claim 17, wherein said liquid droplet spraying means is disposed in the proximity of said hopper-like outlet.

* * * * *